United States Patent [19]

Mesnel

[11] Patent Number: 5,651,217
[45] Date of Patent: Jul. 29, 1997

[54] FLEXIBLE GLASS RUN WITH RIGID MOLDED SUPPORT

[75] Inventor: Gerard Mesnel, Dearborn, Mich.

[73] Assignee: The Standard Products Company, Cleveland, Ohio

[21] Appl. No.: 591,312

[22] Filed: Jan. 25, 1996

[51] Int. Cl.[6] .................................................. E06B 7/16
[52] U.S. Cl. ............................................................ 49/441
[58] Field of Search ............................... 49/440, 441, 502

[56] References Cited

U.S. PATENT DOCUMENTS

| | | |
|---|---|---|
| 4,910,918 | 3/1990 | Naples et al. ........................ 49/441 |
| 4,910,919 | 3/1990 | Kisanuki et al. . |
| 4,923,542 | 5/1990 | Janicki et al. . |
| 4,951,418 | 8/1990 | Keys ..................................... 49/440 |
| 5,001,867 | 3/1991 | Dupuy . |
| 5,042,200 | 8/1991 | Ugawa . |
| 5,067,281 | 11/1991 | Dupuy . |
| 5,086,586 | 2/1992 | Hlavaty et al. . |
| 5,155,938 | 10/1992 | Nozaki . |
| 5,163,248 | 11/1992 | Bielis et al. . |
| 5,195,274 | 3/1993 | Mishima et al. . |
| 5,233,758 | 8/1993 | Bielis et al. . |
| 5,262,114 | 11/1993 | Boyce et al. ..................... 49/440 X |
| 5,265,377 | 11/1993 | Iwasa et al. . |
| 5,308,138 | 5/1994 | Hlavaty . |
| 5,315,788 | 5/1994 | Bensinger et al. . |
| 5,345,718 | 9/1994 | Dupuy . |

Primary Examiner—Philip C. Kannan
Attorney, Agent, or Firm—Harness, Dickey & Pierce, P.L.C.

[57] ABSTRACT

A vehicle door glass run including a header section, and first and second end sections that extend into the door well of the vehicle door below the vehicle belt line. Each section of the glass run includes a flexible metal insert that has been stamped and rolled into a configuration such that a cross-section of the insert includes two adjacent U-shaped portions and a tab portion. An outer layer is extruded around the shape of the insert. The outer layer defines a glass run channel that accepts a vehicle window and a sealing configuration. Plastic support members are molded to the sections that extend into the door well. A bracket attached to or integral with the glass run allows the glass run to be connected to a trim panel within the door well.

24 Claims, 4 Drawing Sheets

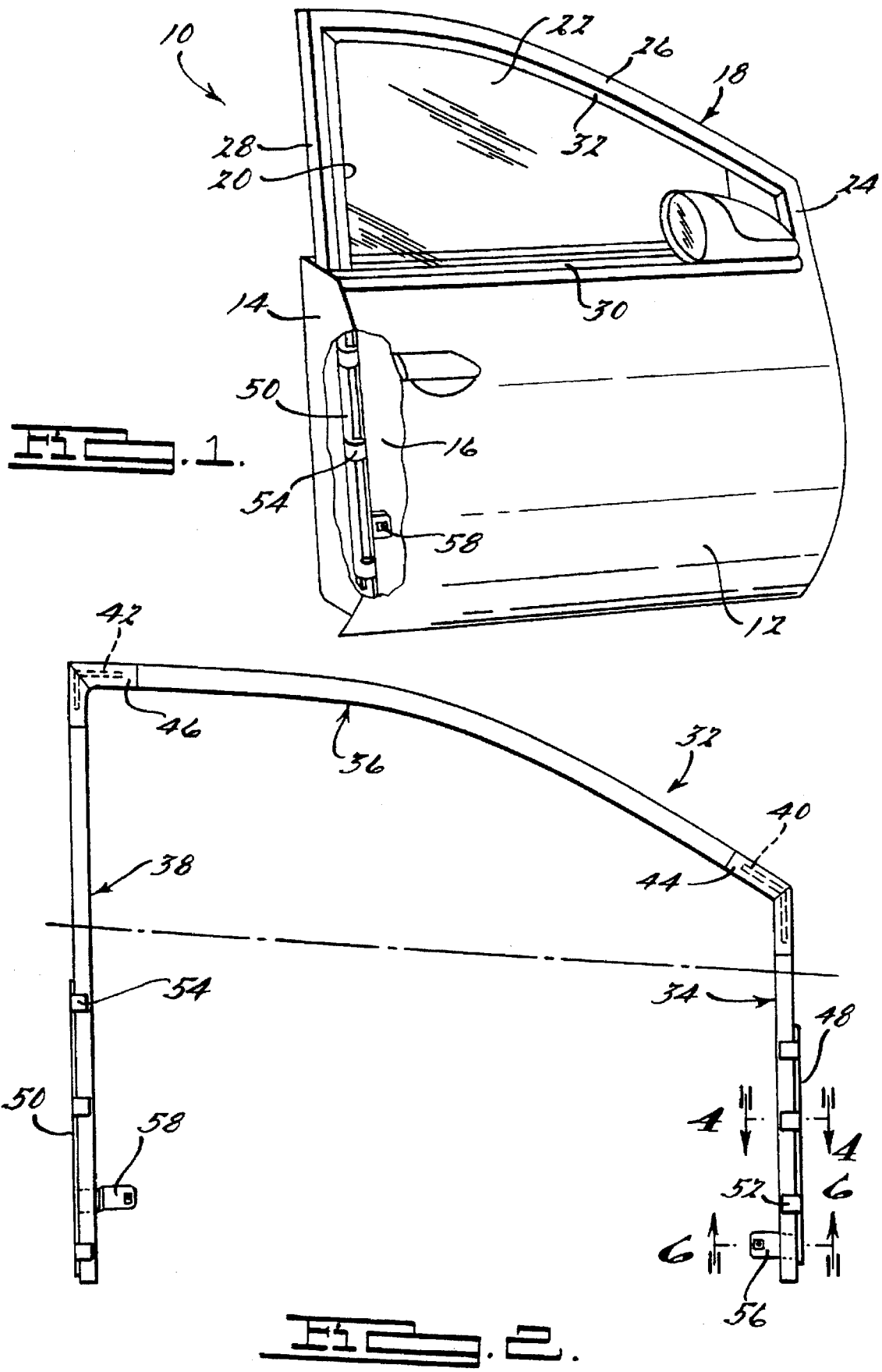

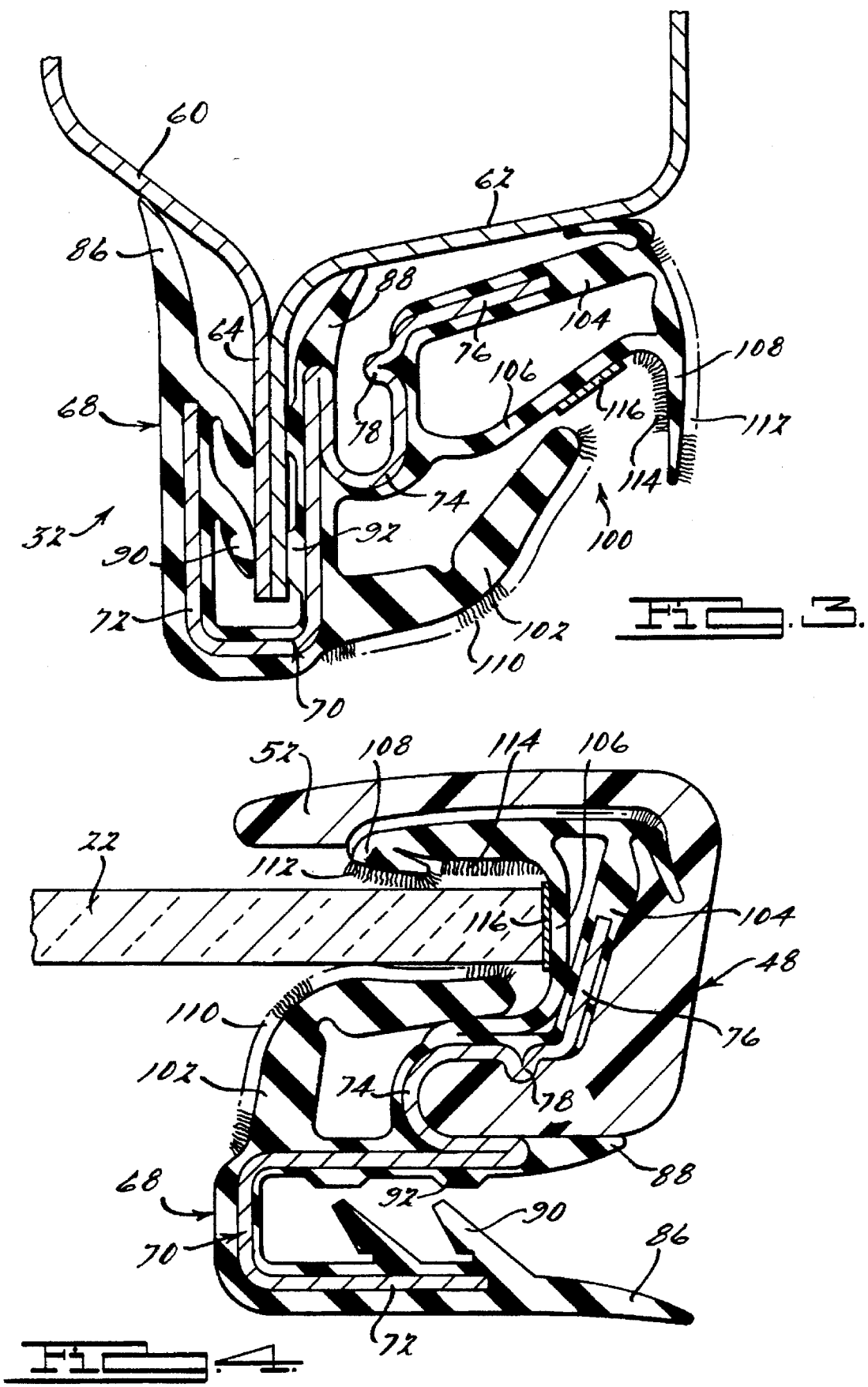

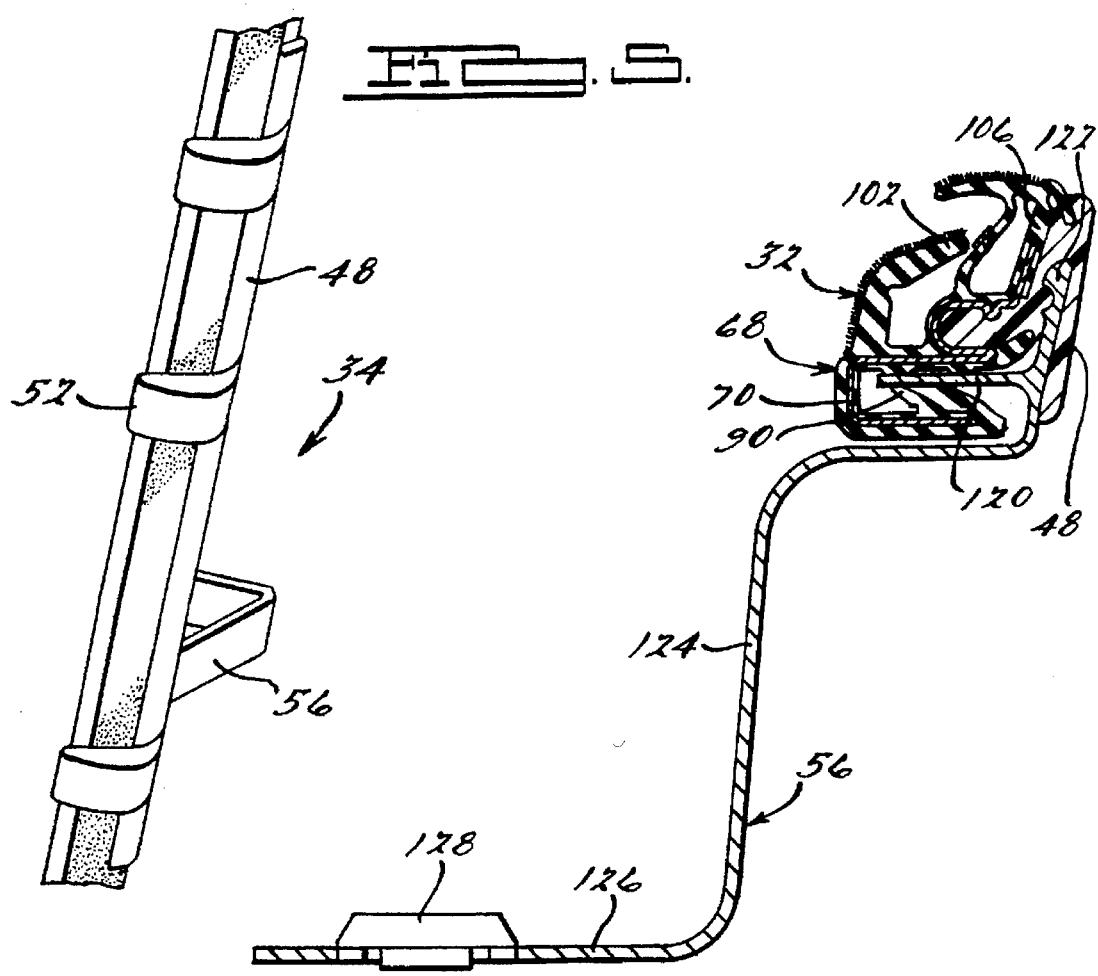
FIG. 5.
FIG. 6.
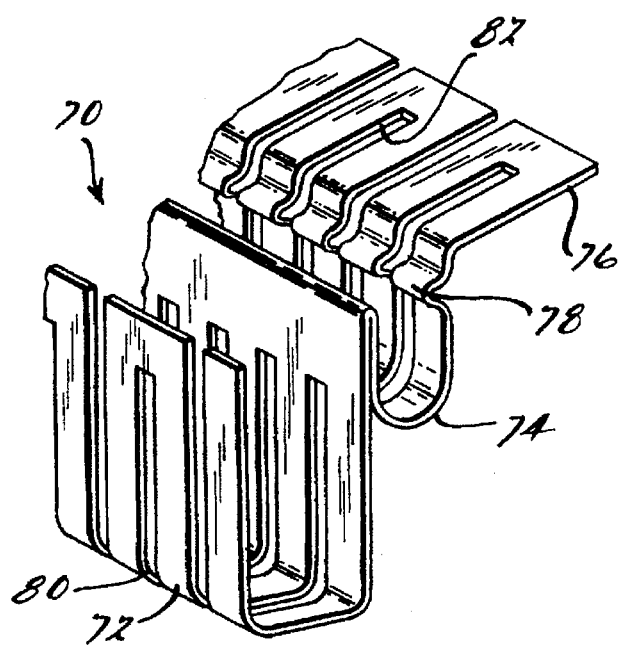
FIG. 8.

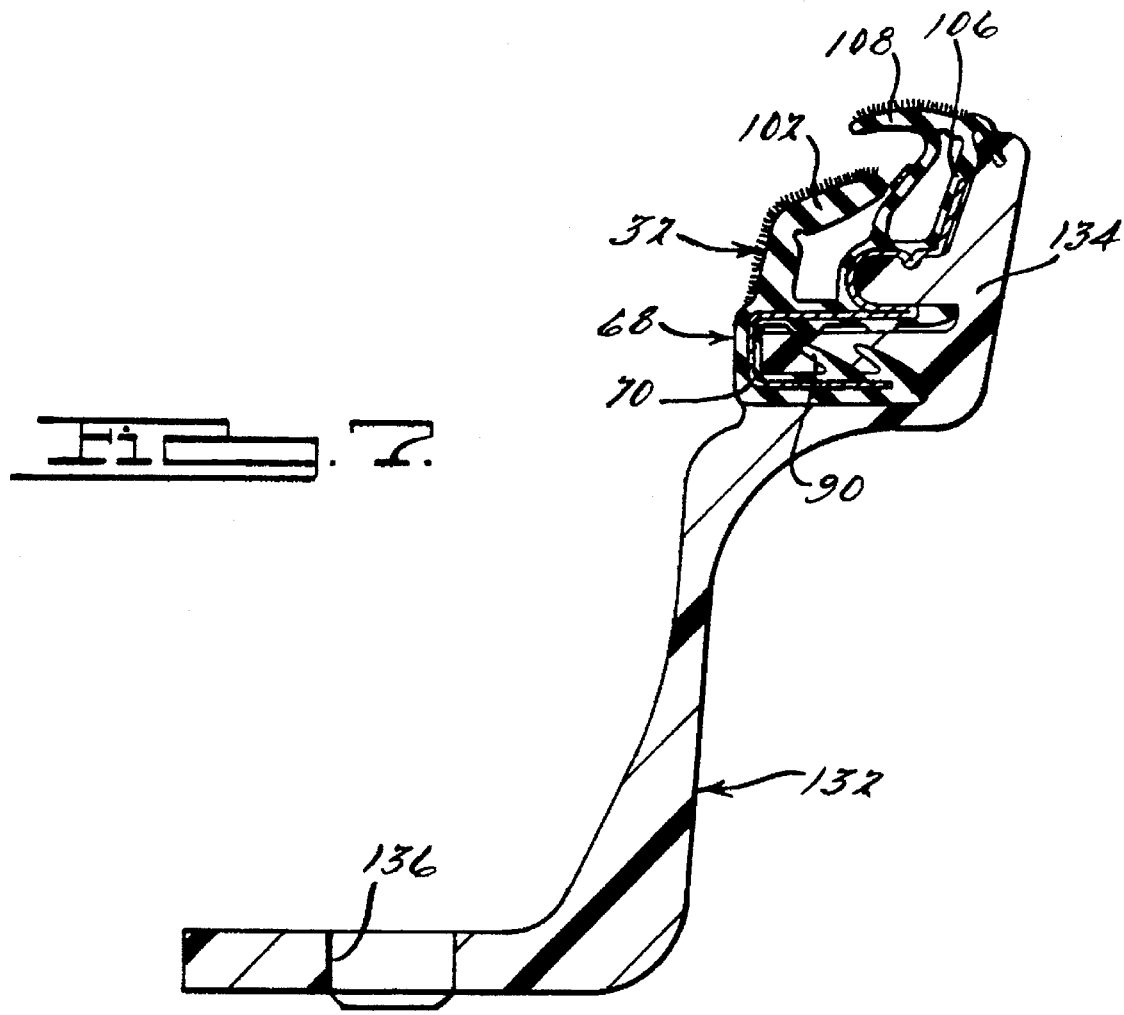

FLEXIBLE GLASS RUN WITH RIGID MOLDED SUPPORT

BACKGROUND OF THE INVENTION

1. Field of the Invention

This invention relates generally to a flexible glass run for a vehicle door opening and, more particularly, to a flexible glass run that is easily secured to a vehicle door flange in the vehicle door opening and includes molded plastic support members to secure the glass run to a door trim panel below the belt line of the door.

2. Discussion of the Related Art

Most vehicle doors include a door window that can either be mechanically or electrically lowered into a door well of the door to open a door opening, or raised from the door well to close the door opening in a sealing manner. These types of vehicle doors include a resilient glass run having a glass run channel that the window seats within when it is in a closed position. Different glass run designs are known in the art that allow the window to be repeatedly inserted within and removed from the glass run channel and still maintain an effective seal against environmental conditions such as wind and moisture. A door belt line that includes a flexible sealing member extends across the bottom of the door opening to allow the window to slide through the belt line in a sealing manner as it is being raised and lowered. Portions of both ends of the glass run extend below the belt line of the door to guide the window within the door well when it is in a lowered position.

In modern designs, the glass run includes an outer layer, such as an EPDM rubber, a thermoplastic material or other suitable material, that is extruded onto a rigid metal insert that gives the glass run support and shape. Usually, the insert is a piece of stamped steel or aluminum. The insert enables the glass run to be rigidly secured to a flange extending from stamped door panels along the periphery of the door opening. Because the flange ends at the bottom of the door opening, there is no flange which to secure the glass run to within the door well. Therefore, brackets are generally provided that are secured to the extended portions of the glass run by bolts or the like. The brackets generally include a tab that extends from the glass run that allows the bracket to be secured to an appropriate area of a door trim panel within the door well.

The above described glass run has been generally successful in meeting the demands required by the industry. However, certain disadvantages of these types of glass runs leaves room for improvement. For example, because known glass runs are rigid members and are not readily flexible, they must be stretch bent to the shape of the door opening before being secured to the door flange. However, inconsistencies in the alignment and position of the flange, as well as the thickness of the flange, require that the glass run be further twisted and bent as it is being secured to the door flange. Because the glass run is rigid, such a process has obvious drawbacks when trying to secure the glass run to the door flange. Also, the resulting twisting nature of the glass run may alter the sealing properties of the glass run channel in the glass run.

Further, because a bracket is needed to secure the glass run to the door within the door well, the curvature of the door and the size of the bracket prevents the glass run from being installed to the door as a single piece at the manufacturing level of the vehicle. The rigidity of the brackets of both extended portions prevents the extended portions of the glass run below the belt line from being simultaneously inserted into the door well. Therefore, at least one of the extended portions of the glass run that fits within the door well must be mated to the glass run when it is bolted to the door trim panel.

What is needed is a flexible glass run that can be readily twisted to be secured to the door flange, and includes a support member for supporting the glass run within the door well that allows the glass run to be connected to the door as a single unit. It is therefore an object of the present invention to provide such a glass run.

SUMMARY OF THE INVENTION

In accordance with the teaching of the present invention, a flexible glass run is disclosed that is readily connected to the flange of a vehicle door, and includes plastic support members that are molded to portions of the glass run that extend below the vehicle belt line. In one embodiment, the glass run includes a flexible semi-rigid insert that has been stamped and rolled into a configuration such that a cross-section of the insert includes two adjacent U-shaped portions and a tab portion. An outer layer of a glass run material is extruded onto the insert. A larger one of the U-shaped portions is used to secure the glass run to a door flange. The other U-shaped portion defines a channel that accepts a connective insert to secure pieces of the glass run together. The outer layer defines a glass run channel that accepts a vehicle window in a sealing. The molded plastic support members are curved such that the glass run can be assembled as a single unit prior to being attached to the vehicle door. Brackets are attached to the glass run and secured to the vehicle trim panel.

Additional objects, advantages, features of the present invention will become apparent from the following description and appended claims taken in conjunction with the accompanying drawings.

BRIEF DESCRIPTION OF THE DRAWINGS

FIG. 1 is an outside perspective view of a vehicle door;

FIG. 2 is an outside view of a glass run according to an embodiment of the present invention;

FIG. 3 is a cross-sectional view of the glass run of the invention as attached to the header of a vehicle door;

FIG. 4 is a cross-sectional view of the glass run of the invention within the door well of the vehicle door along line 4—4 of FIG. 2;

FIG. 5 is a side view of a portion of the glass run of the invention below the belt line of the vehicle;

FIG. 6 is a cross-sectional view of the glass run of the invention within the door well of the vehicle door along line 6—6 of FIG. 2;

FIG. 7 is a cross-sectional view of an alternate embodiment of the glass run of the invention within the door well of the vehicle door; and FIG. 8 is a perspective view of an aluminum insert within the glass run of the invention.

DETAILED DESCRIPTION OF THE PREFERRED EMBODIMENTS

The following discussion of the preferred embodiments directed to a glass run for a vehicle door is merely exemplary in nature and is in no way intended to limit the invention or its applications or uses.

To help illustrate the glass run of the present invention, FIG. 1 shows an outside perspective view of a vehicle door 10 for a vehicle (not shown). The vehicle door 10 includes a stamped outer door panel 12 and a stamped inner door trim panel 14. The door 10 is shown partially broken away to show a door well 16 defined between the outer door panel 12 and the trim panel 14. The outer door panel 12 and the inner door trim panel 14 are secured together by bolts, welds, and the like in a manner that is well understood to one skilled in the art. The outer door panel 12 and the inner door trim panel 14 are stamped to include a window frame 18 that defines a door opening 20 that is closed by a door window 22. The window 22 can be raised and lowered from the door opening 20 by an applicable mechanism (not shown) positioned within the door well 16. The window frame 18 is separated into an A-pillar frame member 24 that is to be positioned adjacent to the A-pillar (not shown) of the vehicle, a header frame member 26 that runs along the roof (not shown) of the vehicle, and a B-pillar frame member 28 that is to be positioned adjacent to the B-pillar (not shown) of the vehicle when the vehicle door 10 is in a closed position. A belt line sealing member 30 is positioned at the bottom of the window frame 18 to allow the window 22 to be lowered into the door well 16 in a sealing manner.

A glass run 32, according to an embodiment of the present invention, is secured to the window frame 18 around the periphery of the opening 20, and includes end portions that extend into the door well 16 below the belt line sealing member 30. An outer side view of the glass run 32 removed from the door 10 is shown in FIG. 2. The glass run 32 is separated into three sections including a front section 34 that runs along the A-pillar frame member 24 and into a front portion of the door well 16, a header section 36 that runs along the header frame member 26, and a back section 38 that runs along the B-pillar frame member 28 and into a back portion of the door well 16. Prior to the glass run 32 being connected to the door 10, the sections 34–38 are cut to the appropriate length. A connective insert 40 is inserted into one end of the front section 34 and one end of the header section 36, and a connective insert 42 is inserted into an opposite end of the header section 36 and an end of the back section 38. The joined ends of the header section 36 and the front section 34, and the joined ends of the header section 36 and the back section 38 are then placed in a mold (not shown) along with a joining material to form a joint area 44 between the front section 34 and the header section 36, and a joint area 46 between the header section 36 and the back section 38.

The discussion below will describe the glass run 32 as including an extruded outer layer of a rubber material. However, as will be appreciated by those skilled in the art, this is by way of a non-limiting example in that the glass run can be made of any suitable material for the purposes described herein. These materials include, for example, natural and synthetic rubbers, thermoplastics, or thermoset plastics. Generally, an outer layer of the glass run 32 is made of an extrudable material that is extruded onto a semi-rigid insert made of a suitable material, such as aluminum or steel. The joining material would be the same material as the outer layer.

As will be discussed in greater detail below, the glass run 32 is attached to a door flange extending from the frame 18 around the door opening 20. The door flange ends at the belt line member 30. However, as shown, a part of the front section 34 and the back section 38 extend below the belt line member 30 and into the door well 16 of the vehicle door 10. Because the flange does not extend beyond the belt line member 30, some mechanism needs to be provided to secure the glass run 32 at these locations in order to properly guide the window 22 when it is in the lowered position.

In order to secure the front section 34 and the back section 38 within the door well 16, the front section 34 is provided with a molded plastic support member 48 and the back section 38 is provided with a molded plastic support member 50. The back section support member 50 is shown in the cut-away of FIG. 1 within the door well 16, and a broken-away portion of the front section 34 showing the support member 48 is shown in FIG. 5. Prior to the front section 34 and the back section 38 being attached to the header section 36, the front section 34 and the back section 38 are placed in an appropriate mold (not shown) to mold the plastic support members 48 and 50 to the glass run 32. The front support member 48 includes retaining tabs 52 and the back support member 50 includes retaining tabs 54 so as to rigidly secure the support members 48 and 50 to the front and back sections 34 and 38, respectively. A bracket 56 is attached to the front section 34 and a bracket 58 is attached to the back section 38 in a manner that will be discussed below. As will be appreciated by those skilled in the art, the brackets 56 and 58 can take on many shapes and can be made of many suitable materials, such as metal brackets or molded plastic brackets that are molded with the plastic support members 48 and 50. The brackets 56 and 58 each include a bolt (not shown) that bolts the front and back sections 34 and 38, respectively, to the door trim panel 14 to hold the glass run 32 in the appropriate position in the door well 16. For a molded plastic bracket, the bolts can be eliminated, and a snap-end type fastener can be used with a properly designed door trim panel. Note that the shape of the support members 48 and 50 are curved substantially the same as the curvature of the door window 22.

FIG. 3 shows a cross-sectional view of the glass run 32 through the header section 36 when the glass run 32 is secured to the window frame 18 and the window 22 is in a down position. The cross-section of the glass run 32 will be the same throughout all the sections 34–38 of the glass run 32. A first stamped metal door section 60 is secured to a second stamped metal door section 62 to define a flange 64 as shown. In one embodiment, the door section 60 would be part of the trim panel 14 and the door section 62 would be part of the outer door panel 12. The door sections 60 and 62 are secured together by known mechanism such as welds.

The glass run 32 includes an outer rubber layer 68 extruded onto a metal insert 70. The shape of the metal insert 70 and the outer rubber layer 68 is unique for the purposes described herein. In one embodiment, the metal insert 70 is defined by an aluminum sheet that has been stamped and rolled to have the shape as shown in FIG. 8. Particularly, the metal insert 70 has been rolled to include a larger square U-shaped portion 72 adjacent to a smaller U-shaped portion 74, as shown. The U-shaped portion 72 includes two legs attached substantially perpendicular to a web that extends between the legs, and the U-shaped portion 74 includes two legs attached to a curved web. Note that one leg of the U-shaped portion 72 is aligned with one leg of the U-shaped portion 74. A tab portion 76 extends from the top of the U-shaped portion 74 opposite from the U-shaped portion 72. An edge 78 extends into the U-shaped portion 74 proximate to the tab portion 76. A series of parallel elongated slots 80 have been stamped and removed from the U-shaped portion 72, and a series of slots 82 have been stamped and removed from the U-shaped portion 74 and the tab portion 76 prior to the insert 70 being rolled into the shape as shown. The slots 80 and 82 reduce the weight and increase the flexibility of the metal insert 70 for the purposes described herein.

As mentioned above, the outer rubber layer 68 is extruded onto the metal insert 70 by an applicable die (not shown) that gives the cross-sectional shape of the glass run 32 as shown in FIG. 3. The rubber layer 68 is formed around the U-shaped portion 72 such that a first extended portion 86 and a second extended portion 88 extend from the legs of the U-shaped portion 72, as shown. Further, a plurality of sealing lips 90 and a plurality of sealing edges 92 are formed on the inside of the U-shaped portion 72. The glass run 32 is attached to the door 10 by forcing the flange 64 within the U-shaped portion 72 such that the sealing lips 90 are forced against the door section 60 that makes up the flange 64, and the sealing edges 92 are forced against the door section 62 that makes up the flange 64, as shown. The extended portion 88 contacts the door section 60 and the extended portion 88 contacts the door section 62. Because the insert 70 and the rubber layer 68 are sufficiently rigid, the flange 64 is held in place by the sealing lips 90 and the sealing edges 92 in a secure manner.

The extruding process does not form a portion of the rubber layer 68 within the U-shaped portion 74 of the metal insert 70. The internal shape of the U-shaped portion 74 and the edge 78 allows the connective inserts 40 and 42 to be inserted into this opening and rigidly secured there to form the joint areas 44 and 46 as discussed above. Previous glass runs were extruded to provide an opening to accept these types of connective inserts in a rubber lined channel. By utilizing the channel formed by the U-shaped portion 74 and the edge 78 to accept the connective inserts 40 and 42, the integrity of the joint areas 44 and 46 can be increased over these prior art glass runs.

The glass run 32 includes a glass run channel 100. The glass run channel 100 is defined by a first finger member 102 that extends from the web or base area of the U-shaped portion 72. A portion 104 of the rubber layer 68 extends from the tab 76 and a portion 106 of the layer 68 extends from the web or base area of the U-shaped portion 74. The portion 104 and the portion 106 both join to a second finger member 108, as shown. A flocking layer 110 is secured to one surface of the finger member 102, a flocking layer 112 is secured to one surface of the second finger member 108, and a flocking layer 114 is secured to an opposite surface of the second finger member 108, as shown. The glass run 32 is shown in its relaxed state in FIG. 3. The flocking layers 110 and 112 ride against an edge of the window 22 when the window 22 is inserted into the glass run channel 100, in the manner that will be discussed below with reference to FIG. 4. A plastic strip 116 positioned within the glass run channel 100 on the portion 106 contacts the window when the window is inserted in the glass run channel 100 so as to reduce wear on the glass run 32.

FIG. 4 shows a cross-sectional view of the glass run 32 through line 4—4 of FIG. 2. As is apparent from this view, the window 22 is in a down location such that the window 22 is positioned within the glass run channel 100. When the window 22 is inserted into the glass run channel 100 at this location, or when the window is in an up location in the glass run channel 100, the window 22 first contacts the flocking layer 110 and forces the finger member 102 upwards and away from the glass run channel 100. As the window 22 continues to travel into the glass run channel 100, the window 22 contacts the plastic strip 116 and forces the section 106 to travel towards the section 104. As the section 106 is pushed towards the section 104, the second finger 108 curves inward and upward and the flocking layer 112 contacts the window 22, as shown. Such a relationship seals the window 22 in the glass run channel 100.

The cross-section of FIG. 4 is through the tab 52 of the support member 48. Therefore, the tab 52 is shown following the contours of the rubber layer 68 as this location of the glass run 32. Note that at this location, the glass run 32 will not be connected to the flange 64. Therefore, plastic is formed within the U-shaped portion 74 to help form the curvature of the door window 22 within the support member 48.

FIG. 6 shows a cross-sectional view of the glass run 32 through line 6—6 of FIG. 2. This view shows the support member 48 being molded to the glass run 32 and the bracket 56 being secured to the glass run 32. As is apparent, the support member 48 is molded to the glass run 32 in a manner that will cause the support member 48 to be rigidly secured to the glass run 32. The bracket 56 includes a tab section 120 that is inserted within the U-shaped portion 72 to contact the lips 90 and the edges 92 in the same manner as the flange 64. The bracket 56 also includes a tab section 122 embedded within the support member 48. To accomplish this, the bracket 56 is placed within a mold along with the glass run 32 when the plastic of the support member 48 is molded to the glass run 32. Therefore, the bracket 56 is rigidly secured to the glass run 32. The bracket 56 further includes an extended section 124 that extends away from the glass run 32 to be attached to a securing section 126. A bolt 128 extends through the securing section 126 to be secured to the trim panel 14 in a manner that is well understood in the art.

FIG. 7 shows an alternate embodiment of a bracket for securing the glass run 32 to the vehicle door 10 below the belt line. In this embodiment, a bracket 132 is simultaneously molded with a support member 134 such that the bracket 132 and support member 134 are a single unit. A suitable attachment mechanism 136 secures the bracket 134 to the trim panel 14.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A glass run for a vehicle door, said glass run comprising:

a header portion, said header portion configured to be rigidly secured to a flange extending from a door opening of the vehicle door;

a first elongated portion connected to one end of the header portion, said first elongated portion being configured to be rigidly secured within a door well of the door; and a second elongated portion connected to an opposite end of the header portion from the first elongated portion, said second elongated portion being configured to be rigidly secured within the door well, each of the header portion, the first elongated portion and the second elongated portion including a rigid insert and an outer layer surrounding the insert, said outer layer including a plurality of resilient fingers defining a glass run channel that accepts a vehicle window in a sealing engagement, wherein the first elongated portion and the second elongated portion each include plastic support members being rigidly secured to the glass run, each of the plastic support members being secured to the outer layer and being separated from the glass run channel, each of the plastic support members further including a bracket configured to be connected to a door trim panel.

2. The glass run according to claim 1 wherein the plastic support members are curved so as to be readily inserted into the door well of the door.

3. The glass run according to claim 1 wherein the plastic support members are plastic members that are molded to the glass run.

4. The glass run according to claim 1 wherein the rigid insert is a metal insert, said metal insert includes a first U-shaped portion and a second U-shaped portion, said first U-shaped portion being configured to accept the flange extending from the door opening in a rigid type engagement.

5. The glass run according to claim 4 wherein the second U-shaped portion includes an edge extending into the interior of the second U-shaped portion, said second U-shaped portion being configured to accept a connective insert, said connective insert connecting the header portion to one of either the first elongated portion or the second elongated portion.

6. The glass run according to claim 1 wherein the glass run channel includes a first finger member, a second finger member and a base member, wherein when the window is inserted into the glass run channel, the window contacts the base member and causes the first finger member to move towards and engage the window in a sealing type manner.

7. The glass run according to claim 1 wherein the rigid insert is a metal insert, said metal insert is formed from an aluminum sheet that has been stamped and rolled to include a first U-shaped portion having first and second leg sections that connect to a base section substantially at right angles, a second U-shaped portion positioned adjacent to the first U-shaped portion, said second U-shaped portion including first and second leg sections attached to a base section, wherein the second leg of the first U-shaped portion is adjacent to the first leg section of the second U-shaped portion, and a tab portion extending from the second leg section of the second U-shaped portion.

8. The glass run according to claim 1 further comprising a first bracket and a second bracket, said first bracket being a plastic molded member that is integrally molded with the plastic support member of the first elongated portion and the second bracket is a plastic bracket integrally molded with the support member of the second elongated portion.

9. A glass run for a vehicle door, said glass run comprising:
   a metal insert, said metal insert having a cross-section defining a first U-shaped portion, a second U-shaped portion and a tab portion, wherein the first U-shaped portion is positioned adjacent to the second U-shaped portion, said tab portion extending from a leg section of the second U-shaped portion opposite to the first U-shaped portion; and
   an outer layer extruded onto the metal insert, said outer layer defining sealing edges positioned within the first U-shaped portion that are configured to accept a flange of the vehicle door in a rigid engagement, said outer layer defining a glass run channel that includes a first finger member, a base member and a second finger member, wherein a vehicle window is positioned within the glass run channel to contact the base member and cause the second finger member to engage the window in a sealing type engagement.

10. The glass run according to claim 9 wherein the first finger member and the second finger member include a flocking layer that rides against the window when the window is in the glass run channel so as to allow the window to readily be inserted and withdrawn into and out of the glass run channel.

11. The glass run according to claim 9 wherein the outer layer includes a base portion formed around the tab portion such that the base member contacts the base portion when the window is in the glass run channel.

12. The glass run according to claim 9 wherein the metal insert further includes an edge portion that extends into the interior of the second U-shaped portion so as to define a channel therein, said channel accepting a connective insert so as to connect sections of the glass run.

13. The glass run according to claim 9 wherein the metal insert is an aluminum member formed by stamping an aluminum sheet and then rolling the stamped aluminum sheet to include the first U-shaped portion, the second U-shaped portion and the tab portion.

14. The glass run according to claim 13 wherein the metal insert is stamped to include a plurality of slots where aluminum material has been removed.

15. The glass run according to claim 9 further comprising a molded plastic support member, said molded plastic support member being molded to the glass run such that plastic is formed within the second U-shaped portion.

16. A glass run for a vehicle door, said glass run comprising:
   a metal insert;
   an outer layer formed on the metal insert, said outer layer including a glass run channel that accepts a door window, said outer layer further including a support portion; and
   a plastic support member molded to the support portion of the outer layer, said molded plastic member being molded to the outer layer such that the plastic member is separated from the glass run channel, said molding member including a bracket to secure the glass run to a vehicle door trim panel.

17. The glass run according to claim 16 wherein the molded plastic support member includes a plurality of retainer tabs that are formed around a portion of the glass run.

18. The glass run according to claim 16 wherein the bracket is secured within a U-shaped portion of the glass run and configured to be secured to the trim panel.

19. The glass run according to claim 16 wherein the bracket is a plastic bracket integrally molded with the plastic support member as a single unit.

20. The glass run according to claim 16 wherein the metal insert is an aluminum member formed by stamping an aluminum sheet and then rolling the aluminum sheet in a configuration such that a cross-section defines a first U-shaped portion, a second U-shaped portion and a tab portion, wherein the first U-shaped portion is larger than the second U-shaped portion and positioned adjacent to the second U-shaped portion and the tab portion extends from a leg of the second U-shaped portion opposite to the first U-shaped portion.

21. The glass run according to claim 16 wherein the outer layer defines a glass run channel that includes a first finger member, a base member and a second finger member, wherein when the window is positioned within the glass run channel, the window contacts the base member and causes the second finger member to engage the window in a sealing type engagement.

22. A glass run for a vehicle door, said glass run comprising:
   a header portion, said header portion configured to be rigidly secured to a flange extending from a door opening of the vehicle door;
   a first elongated portion connected to one end of the header portion, said first elongated portion being configured to be rigidly secured within a door well of the door;

a second elongated portion connected to an opposite end of the header portion from the first elongated portion, said second elongated portion being configured to be rigidly secured within the door well, wherein the first elongated portion and the second elongated portion each include plastic support members being rigidly secured to the glass run, each of the plastic support members including a bracket configured to be connected to a door trim panel; and a metal insert, said metal insert being formed from an aluminum sheet that has been stamped and rolled to include a first U-shaped portion having first and second leg sections that connect to a base section substantially at right angles, a second U-shaped portion positioned adjacent to the first U-shaped portion, said second U-shaped portion including first and second leg sections attached to a base section, wherein the second leg of the first U-shaped portion is adjacent to the first leg section of the second U-shaped portion, and a tab portion extending from the second leg section of the second U-shaped portion.

23. A glass run for a vehicle door, said glass run comprising:

a metal insert;

an outer layer formed on the metal insert, said outer layer defining a glass run channel that accepts a door window; and a plastic support member molded to at least a portion of the glass run, said molded plastic member including means for securing the glass run to a vehicle door trim panel, said molded plastic member further including a plurality of retainer tabs that are formed around a portion of the glass run.

24. A glass run for a vehicle door, said glass run comprising:

a metal insert, said metal insert being an aluminum member formed by stamping an aluminum sheet and then rolling the aluminum sheet in a configuration such that a cross-section defines a first U-shaped portion, a second U-shaped portion and a tab portion, wherein the first U-shaped portion is larger than the second U-shaped portion and positioned adjacent to the second U-shaped portion and the tab portion extends from a leg of the second U-shaped portion opposite to the first U-shaped portion;

an outer layer formed on the metal insert, said outer layer defining a glass run channel that accepts a door window; and a plastic support member molded to at least a portion of the glass run, said molded plastic member including means for securing the glass run to a vehicle door trim panel.

* * * * *